US007285319B1

(12) United States Patent
Steiner et al.

(10) Patent No.: US 7,285,319 B1
(45) Date of Patent: Oct. 23, 2007

(54) ENGRAVED SURFACE AND METHOD

(76) Inventors: Jason Austin Steiner, 5333 Arville, Suite 102, Las Vegas, NV (US) 89119; Sandy Austin Steiner, 5333 Arville, Suite 102, Las Vegas, NV (US) 89119

( * ) Notice: Subject to any disclaimer, the term of this patent is extended or adjusted under 35 U.S.C. 154(b) by 504 days.

(21) Appl. No.: 10/461,727

(22) Filed: Jun. 12, 2003

Related U.S. Application Data

(60) Provisional application No. 60/388,594, filed on Jun. 12, 2002.

(51) Int. Cl.
*B32B 3/10* (2006.01)
*B32B 15/04* (2006.01)

(52) U.S. Cl. .................. 428/195.1; 428/201; 428/203; 428/209; 428/626; 428/935

(58) Field of Classification Search ................. 205/120
See application file for complete search history.

(56) References Cited

U.S. PATENT DOCUMENTS

| | | | | | |
|---|---|---|---|---|---|
| 1,488,240 | A | * | 3/1924 | Gulick | 427/270 |
| 1,821,577 | A | * | 9/1931 | Povalski | 40/629 |
| 1,915,642 | A | * | 6/1933 | Arbuckle et al. | 427/259 |
| 2,415,361 | A | * | 2/1947 | Mell | 205/120 |
| 4,166,092 | A | | 8/1979 | Remba-Grondovski | 264/221 |
| 4,221,758 | A | | 9/1980 | Burkey et al. | 264/225 |
| 4,384,945 | A | | 5/1983 | Sword | 204/181 |
| 4,787,837 | A | | 11/1988 | Bell | 425/385 |
| 4,912,824 | A | | 4/1990 | Baran | 29/121.2 |
| 4,944,164 | A | | 7/1990 | Butler et al. | 63/12 |
| 5,027,537 | A | * | 7/1991 | Freeman et al. | 40/210 |
| 5,112,453 | A | | 5/1992 | Behr et al. | 204/129.2 |
| 5,247,884 | A | | 9/1993 | Rid | 101/375 |
| 5,465,780 | A | | 11/1995 | Muntner et al. | 164/516 |
| 6,007,637 | A | | 12/1999 | Sindzingre et al. | 134/2 |
| 6,134,785 | A | * | 10/2000 | Walter et al. | 29/890.054 |
| 6,294,111 | B1 | | 9/2001 | Shacklett, III et al. | 252/518.1 |
| 2002/0068148 | A1 | * | 6/2002 | Nakamura et al. | 428/131 |
| 2004/0224181 | A1 | * | 11/2004 | Galan | 428/614 |

FOREIGN PATENT DOCUMENTS

| | | | |
|---|---|---|---|
| JP | 49-117511 | * | 11/1974 |
| JP | 53-44436 | * | 4/1978 |
| JP | 61-037998 | * | 2/1986 |
| JP | 07-333356 | * | 12/1995 |

* cited by examiner

*Primary Examiner*—John J. Zimmerman
(74) *Attorney, Agent, or Firm*—John C. Lambertsen

(57) ABSTRACT

An engraved surface in a metallic workpiece and an engraving method therefor, for use in providing a decorative metallic surface. An engraved pattern is formed in a workpiece prior to the formation of an electroplated layer that continuously extends over the engraved pattern and adjacent surface areas of the workpiece. The engraved pattern includes wall-cut engravings inscribed in the workpiece that are used to define outer boundaries of the engraved pattern. The substantially vertical walls obtained by such wall-cut engravings permits a sharp, well-defined boundary between the engraved pattern and adjacent painted surfaces. A mask material is first applied to cover the engraved pattern, and then trimmed to create the sharp edge at the boundary of the engraved pattern. This permits a paint layer to be formed immediately adjacent to the engraved pattern, providing a decorative juxtaposition in an electroplated metallic surface after removal of the mask layer.

6 Claims, 2 Drawing Sheets

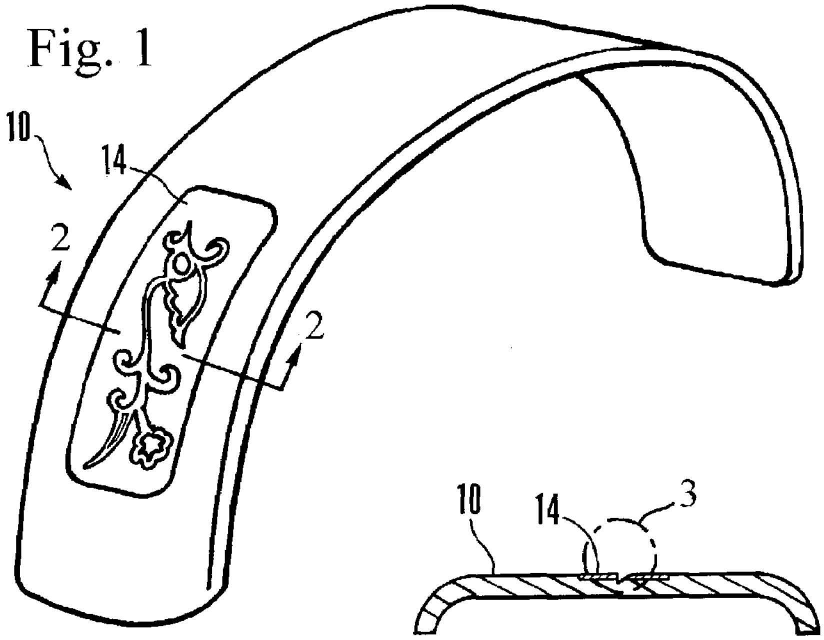
Fig. 1
Fig. 2
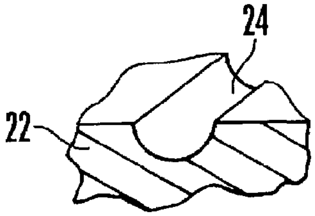
Fig. 3A
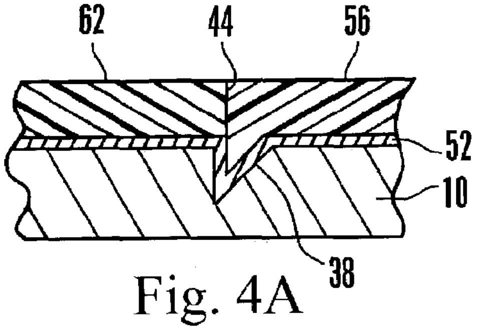
Fig. 4A
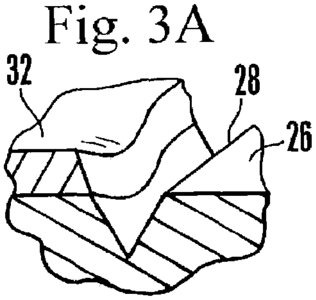
Fig. 3B
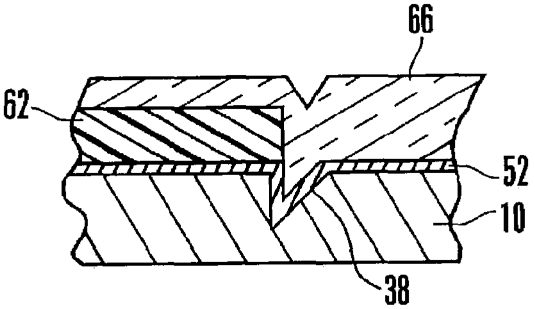
Fig. 4B
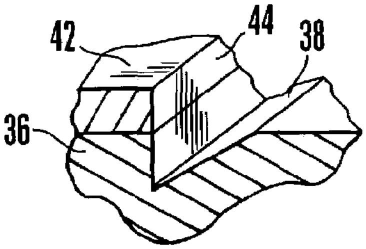
Fig. 3C

ENGRAVED SURFACE AND METHOD

CROSS-REFERENCE TO RELATED APPLICATION

This application claims the benefit of U.S. Provisional Patent Application Ser. No. 60/388,594, filed Jun. 12, 2002.

BACKGROUND OF THE INVENTION

1. Field of the Invention

The present invention relates to an engraving technique and resulting engraved metal surface and, more particularly, to such engraved metal surfaces as may be decoratively employed. More specifically, the present invention relates to engraved metal surfaces, and the process to obtain same, that permit subsequent electroplating and colorization to obtain highly decorative surfaces.

2. Description of the Prior Art

It has been estimated that for the year 2001, the value of the U.S. Gross Domestic Motorcycle Product (GDMP) is approximately $25 billion. Approximately $5 billion is in new motorcycles, the remainder in the sale of used cycles, parts, and services relating to motorcycle sales and maintenance.

The Harley-Davidson V-twin cycles have been a large participant in the revival in motorcycle popularity beginning in the early 1990's. Such motorcycles cater to the individualistic rider, and while the outward appearance may seem unvarying to non-riders, it is important for most Harley owners to differentiate their motorcycle in some important visual manner.

Since many motorcycles share the same or similar aftermarket parts, oftentimes the visual differences arise from the paint and graphics applied to tanks and fenders. These parts are small and easily removed, making them far easier to paint than automobiles. As many riders discover, however, the paints that are most readily available and easily applied also tend to degrade the fastest in response to sunlight, weather, and general wear and tear.

Professional motorcycle painting traces its genesis to Kenneth "Von Dutch" Howard, a custom painter out of the 1950's and 1960's southern California school that also featured Ed "Big Daddy" Roth. Von Dutch had a talent for design and craftsmanship that essentially invented the motorcycle art of pinstriping.

Such exotic paint schemes have since evolved to ones that cost thousands of dollars and involve elaborate airbrush techniques and pigmentation. When clear-coated with protective layers, these elaborate works of art might last several years if reasonable attended to by the owner. Such owners often highlight their paint schemes by adding various chromed metal accent pieces. Most motorcycle owners, like the collectors of 1950's and 1960's automobiles, particularly value the deep metal shine of chromed parts.

Motorcycle fenders, gas tanks, and other small metal exterior parts are generally fabricated out of steel, aluminum, and brass or similar such metals. Finishing typically involves electroplating, using copper, nickel, chrome, brass, silver, gold or a combination, or painting, as previously described. It is normally not possible to electroplate over a painted surface, or paint over an electroplated surface—the latter being too smooth for the paint to reliably adhere.

Metal engraving is a well-known art, and provides designs of long last, since they represent cuts into the outer metal. If the part is to be electroplated, such coating must be applied after the engraving, since otherwise the engraver would remove the electroplated layer as the design is formed into the metal. Such breaks in the chrome layer would encourage further separation of the chrome from the underlying metal, resulting in the "peeling chrome" look that was common on aging chrome automobile bumpers in the snow and ice "road salt" areas of the United States.

Unfortunately, pre-electroplate engraving presented other technical problems. When using present laser, pantograph, rotary or other mechanical means, the engraved lines would be largely covered by the subsequently applied plated surface, considerably lessening, if not entirely eliminating, the impact of the engraved design.

Ideally, it would be desirable to provide a decorative metal surface that is able to utilize the long lasting benefits of engraving with the deep metal finishes provided by electroplating and the rich color obtained through paint pigments.

SUMMARY OF THE INVENTION

It is an object of the present invention to provide an engraved surface that can be subsequently electroplated without definitional loss of the overall engraved design. In this regard a surface having a greater depth and wider engraved angle is provided.

It is a further object of the present invention to provide both a painted and engraved electroplated surface. By the utilization of both engraving and the application of a protective mask, both types of surfaces can be obtained. After electroplating the part, preferably first with copper and then a final electroplated coating of nickel, the engraved area is masked, and the area where paint will be applied is first roughed and then painted.

After removing the mask, the entire surface is covered with a protective coat, resulting in co-existing engraved and painted electroplated surfaces. Visually, the metal surface displays a deep, engraved cut design with the shine of a nickel electroplate, with immediately adjacent surfaces having a durable painted coating.

These objects, as well as other objects and advantages of the present invention will become readily apparent upon review of the description of a non-limiting illustrative embodiment and the accompanying drawings.

BRIEF DESCRIPTION OF THE DRAWINGS

FIG. 1 is a perspective view of a motorcycle fender having an engraved design portion in accordance with the present invention.

FIG. 2 is a cross-sectional view taken along line 2-2 of FIG. 1, showing placement of an engraved design on a fender part in accordance with the present invention.

FIG. 3A is an enlarged partial perspective view showing a shallow engraving cut in a metal workpiece, representative of prior art engravings.

FIG. 3B is an enlarged partial perspective view showing a "V-" type engraving cut and an attempted masked application of a paint, again representative of prior art techniques.

FIG. 3C is an enlarged partial perspective view showing an engraved cut and applied paint layer in accordance with the present invention.

FIG. 4A is an enlarged partial elevation view showing an engraved cut beneath paint and mask layers in accordance with the present invention.

FIG. 4B is an enlarged partial elevation view showing an engraved cut beneath a protective coating covering bare engraved metal immediately adjacent a paint coating in accordance with the present invention.

DETAILED DESCRIPTION OF THE PREFERRED EMBODIMENTS

Figure 5:
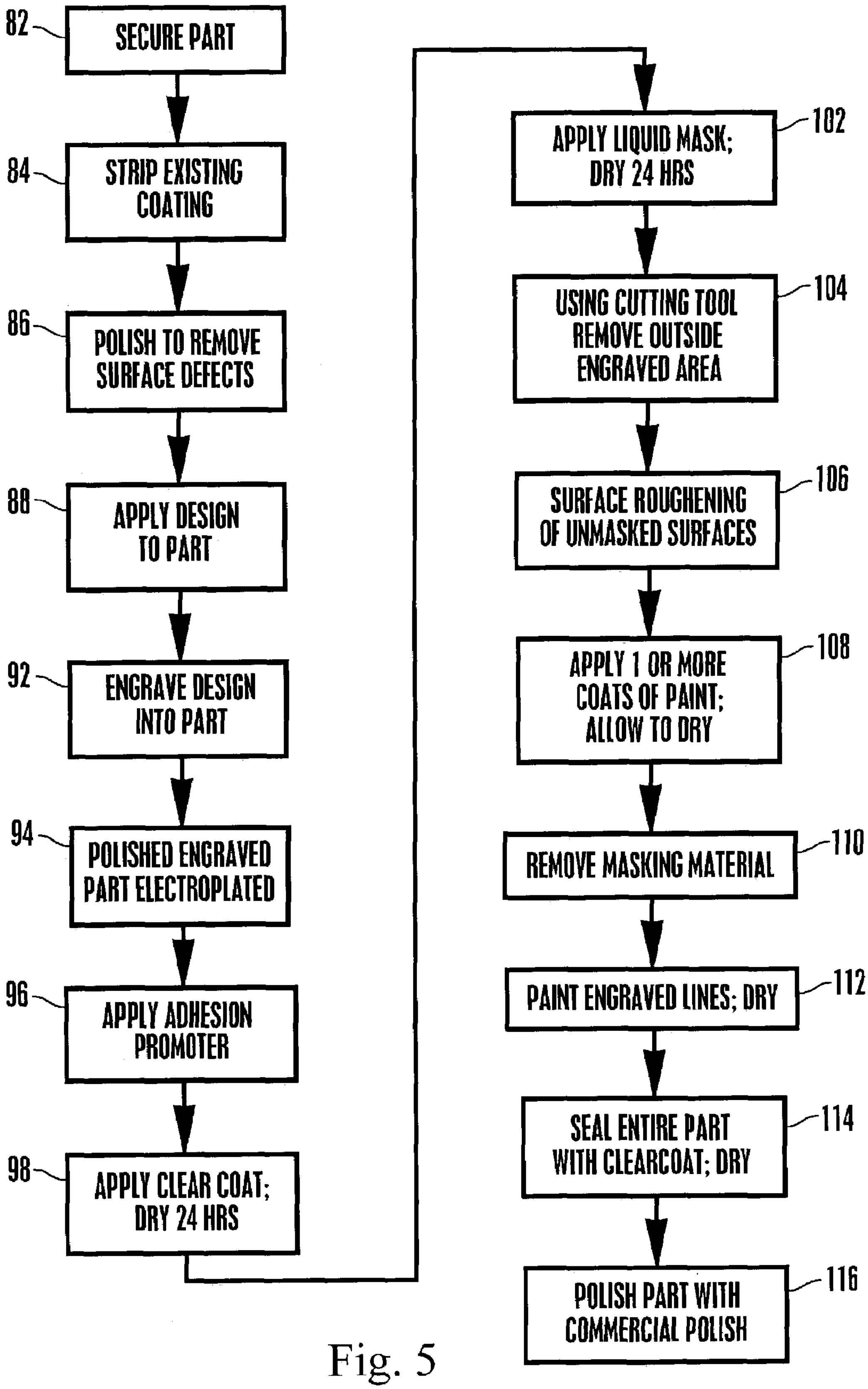
FIG. 5 is a schematic view of a method for fabricating the engraved and painted metal surface of FIG. 4B.

Reference is now made to the drawings wherein like numerals refer to like parts throughout. In FIG. 1, a motorcycle fender 10 is shown, rounded in a conventional manner to protect the motorcycle (not shown in the Figures) from debris picked up from the road by the tire. The majority of motorcycle external parts are fabricated out of steel, in various forms, such as stainless, cold-rolled, carbon, or out of various forms of aluminum, such as milled, billeted, cast, and molded. Additionally, although a motorcycle fender piece is depicted, the present invention is not to be viewed as in any manner limited to the purpose or nature of the underlying metal piece.

An engraved surface 14 is formed in a portion of the fender 10. In a presently preferred embodiment, prior to forming the engraved surface 14 the metal part is first highly polished using known techniques and procedures. For example, depending upon the metal and its original surface state, various polishing compounds ranging from 80 to 1500 grit may be required. Such polishing, as well as other remedial metal processing, is intended to remove the gouges, dents, scratches, waves, ripples, and other commonly encountered surface defects in manufactured metal parts. After the metal surface is highly polished and otherwise free of these various defects, the part is ready to be engraved.

As is depicted in FIG. 2, the engraved surface 14 normally occupies only a portion of outer surface of the metal part. Hand engraving has been in existence for thousands of years. Skilled artisans push or hammer a sharp and extremely hard small metal cutting tool termed a "graver," through a metal that is softer than the graver, to obtain precisely positioned cuts. The artful combination of numerous cuts creates the engraved design.

Originally relying upon rocks and then "chasing hammers" to push or strike the graver, subsequent improvements have allowed the engraver to use pneumatic devices, such as those disclosed in U.S. Pat. Nos. 3,393,755 and 5,515,930 to strike against the graver. These tools primarily serve as a time saving device for the modern engravers.

In more recent historical times there are mechanical and laser engravers that can be considerably automated. Turning to FIG. 3A, a first workpiece 22 is shown having a u-cut engraving 24 formed therein. This relatively wide and shallow cut is exemplary of the types of cuts made by mechanical or laser engravers. Such cuts are appropriate for name engravings on trophies and the like, where there is to be no further processing of the metal part. It can readily be understood how overlaying an electroplated coating (not shown in FIG. 3A) might easily partially or completely fill the u-cut engraving 24.

In FIG. 3B a second workpiece 26 is shown with a v-cut engraving 28 formed therein. A slumped paint layer 32 has been formed over a portion of the second workpiece 26. The failure of the painted layer to properly form is as a result of the sloped sides of the v-cut engraving 28. Where the slope is insufficiently steep, it becomes difficult to accurately mask off the non-painted area, and it likewise is difficult to accurately remove only the mask and not the paint layer after the painting is complete. In some ways, the best that can be done is to cut along the extended slope, resulting in a feathered paint layer (not shown in the drawings).

FIG. 3C depicts a presently preferred manner of engraving, with a third workpiece 36 having a wall-cut engraving 38 formed therein. Having a substantially vertical outer wall, the wall-cut engraving 38 provides a template for fabricating a fine-edge paint layer 42 having an edge that extends vertically from the wall-cut engraving 38 in the manner of a paint wall 44. Such an accurate placement of the paint edge is essential towards the creation of an esthetically pleasing design.

In FIG. 4A the resultant structure is illustrated in the context of the wall-cut engraving 38 made in the fender 10. To assure their visibility after one or more electroplated layers have been deposited, in accordance with the presently preferred embodiment, the engravings are inscribed to a depth in the metal workpiece of between 0.010 inches to 0.017 inches, with width of the engravings varying between 0.010 inches and 0.050 inches. Subsequent to such engraving an electroplate layer 52 is deposited over the entire surface of the fender 10. Such layers are typically very thin, ordinarily in the range of 0.005 inches to 0.008 inches in depth. A mask material 56 is then deposited over a selected surface of the fender 10, including within the wall-cut engraving 38. The substantially vertical wall of such engraving permits the formation of a substantially vertical mask edge. A paint layer 62 is formed over the un-masked surface of the fender 10, forming the paint wall 44 at its interface with the mask material 56.

As is depicted in FIG. 4B, upon removal of the mask material 56, a sealant or clear coat layer 66 is formed over the entire outer surface of the fender 10. An indentation 72 is formed in the clear coat layer 66 in substantial registration with the wall-cut engraving 38. This surface expression of the distinctive engraving further enhances the visual impression of both its depth and the visual metallic purity of the electroplated layer 52.

FIG. 5 depicts, in schematic form, a simplified method for creating the component layers of the engraved surface 14 of FIG. 1. After selection, a metallic part, such as the fender 10, is initially secured 82.

The surface of metallic parts are subjected to all types of contaminants, both as a result of fabrication and caused by conditions encountered during transport and storage. Prior to initiation of further processing, all such surface contaminants must be stripped 84 from the metallic part. Various solvents are known to the art and are appropriate for specific types of contaminants and types of metal.

Such preliminary surface treatment continues with a robust surface polishing 86 to remove as many surface defects as possible. As mentioned previously, this will typically involve the use of a variety of polishing compounds selected as required by the surface blemishes and the type of metal to be polished.

A design is then applied 88 to the appropriate surface area or areas on the metal part. In a preferred embodiment such application is by conventional means, such as being directly drawn on the part or by a design transfer from a paper rendition to the metal part.

The transferred design is then engraved 92 into the metal part. In a presently preferred embodiment, the engraving is done by hand using traditional hand engraving methods and tools. The invention is not to be viewed as in any way limited to hand engraving. The factors presently viewed to be important are that the engraving be of sufficient depth to remain distinctive after an electroplated layer is applied and that the engraving create a wall-cut feature, meaning that the outer engraved walls must be substantially vertical, with a range of between 80 to 90 degrees presently viewed to be acceptable for the purposes of the present invention.

After engraving the metal part is again polished, to smooth any stray markings and normal engraving nicks and burrs. Once the surface is again satisfactorily smooth, the part is electroplated 94. As presently preferred, the initial electroplate layer is of copper, which enhances the ability to obtain a more uniform and adhering second layer of nickel. The secondary layer can be of other metals, such as gold, silver, brass, and others; however, nickel is presently preferred due to the deepness of its metallic shine—assuming a chromed-type surface reflectivity.

Optionally, an adhesion promoter is applied 96 to the metal part prior to the application of a clear coating material 98. This coating is then allowed to dry or cure for a period of preferably 24 hours. Such a coating, when used, further enhances the adhesion properties of the subsequently applied paints.

Depending upon the desired optical effects of a particular design, a liquid mask material is applied 102 to selected portions of the metal piece. Appropriate mask materials might include Metal Flake Spray MaskT™ manufactured by the Metal Flake Corporation of Amesbury, Mass. An appropriate time is accorded to permit the complete curing of the mask material—such as 24 hours when Metal Flake Spray MaskT™ is used.

Whether airbrushed or physically painted on, the mask material is purposefully applied approximately ¼ inch beyond the engraved area borders. This excess material must be removed, and typically the mask material lying outside of the engraved area is removed utilizing a small cutting tool such as a razor blade or an EXACTO® knife 104. Such a tool creates a clear and distinct line of masking material separating the engraved area from the non-engraved area. Essentially an extremely thin, substantially vertical "wall" of masking material is formed between the outside line of the engraving and the non-engraved portion by this trimming procedure.

The exposed, un-masked surface regions that are to receive a coating of paint are first subjected to a surface roughening 106 to enhance the adhesion of the paint to the electroplated surface. Such surface roughening can appropriately be obtained utilizing either a fine grit sandpaper or known liquid grit compounds.

One or more coats of paint are then applied and allowed to dry 108. Various types of paint are appropriate, and the application process will depend upon the type of paint selected. Paints manufactured by House of Paints of Picayune, Miss. are appropriate for this procedure. Depending upon such factors as color and type of paint selected, it may be necessary to apply several coats of paint, sometimes in various colors, to achieve the effect desired. These considerations are primarily artistic in nature and are not the result of any requirements or limitations of the present engraved surface or method.

The masking material is then carefully removed 110, revealing a sharp distinction between the electroplated, engraved surface and the painted area outside of the design. The "wall" of masking material has resulted in the creation of a "wall of paint" when the masking material is removed. This "wall" clearly and sharply delineates and physically separates the painted area from the nickel-plated, engraved design.

Where desired, color may be applied to the bottom portion of the engraved lines. A presently preferred manner of affecting such color utilizes the application of a small amount of paint within the engraved cuts. Such paint is then allowed to dry 112. An example of an appropriate line of paints might be located from among those supplied by House of Kolor, Picayune, Miss.

Regardless of whether color is applied to the engraved lines, completion of the decorative surface requires the application of commercially available clear coat paint to seal both the engraved and painted areas 114. Several separately applied clear coat layers may be required to enhance the project. The coatings are allowed to dry/cure and then one final polishing is performed on the entire surface 116.

Our invention has been disclosed in terms of a preferred embodiment thereof, which provides an engraved, decorative surface of great originality and ornamentality that is of great novelty and utility. Various changes, modifications, and alterations in the teachings of the present invention may be contemplated by those skilled in the art without departing from the intended spirit and scope thereof. It is intended that the present invention encompass such changes and modifications.

The invention claimed is:

1. An engraved surface comprising:

a metallic workpiece having an outer surface;

a plurality of cuts selectively formed in at least a portion of said outer surface, said plurality of cuts collectively comprising an engraved pattern;

an electroplated layer formed on and continuously extending over said outer surface and said engraved pattern; and a paint layer adhering to and covering selected portions of said outer surface adjacent said engraved pattern, wherein at least a portion of said paint layer is located immediately adjacent at least a portion of said engraved pattern and defines a paint layer surface engraving interface, said engraved pattern adjacent said paint layer surface engraving interface comprising a wall-cut engraving, and wherein said wall-cut engraving defines a substantially vertical engraved outer wall and said paint layer surface engraving interface comprises a wall of paint, said wall of paint and said substantially vertical engraved outer wall are in substantial register relative to one another.

2. An engraved surface according to claim 1, wherein said wall of paint and said substantially vertical engraved outer wall collectively define a single, substantially vertical outer wall.

3. A metallic surface comprising:

a metal workpiece with an outer surface, said outer surface having an engraved surface formed therein over a selected portion thereof;

at least one wall-cut engraving inscribed within said outer surface and defining an outer periphery of said engraved surface, said wall-cut engraving comprising in part a substantially vertical wall formed therein;

an electroplated layer formed on said outer surface and continuously extending across said engraved surface and at least an area of said outer surface substantially adjacent to said engraved surface; and a paint layer attached to and overlying at least a portion of said electroplated layer, wherein said paint layer overlies said electroplated layer at a location substantially adjacent to said engraved surface at a location adjacent said at least one wall-cut engraving and wherein a periphery of said paint layer and said substantially vertical wall of said wall-cut engraving are in substantial register with one-another.

4. A metallic surface according to claim 3, wherein a slope of said vertical wall lies within a range of 80 to 90 degrees.

5. A metallic surface according to claim 3, wherein said periphery of paint layer in substantial register with said wall-cut engraving defines a wall of paint.

6. A metallic surface according to claim 5, and further comprising a clear coat layer formed on and overlying in a substantially continuous manner said engraved surface, said electroplated layer, and said paint layer.

* * * * *